United States Patent
Doering et al.

(10) Patent No.: US 6,409,071 B1
(45) Date of Patent: Jun. 25, 2002

(54) METHOD FOR ASSEMBLING, BY WELDING, A COIL WITH AN INTEGRATED CIRCUIT OR AN ELECTRONIC UNIT OF SMALL DIMENSIONS

(75) Inventors: Elko Doering, Mörigen; Pascal Cattin, Cressier; Uwe Thiemann, Gals, all of (CH)

(73) Assignee: EM Microelectronic Marin SA, Marin (CH)

( * ) Notice: Subject to any disclaimer, the term of this patent is extended or adjusted under 35 U.S.C. 154(b) by 0 days.

(21) Appl. No.: 09/534,983

(22) Filed: Mar. 27, 2000

(30) Foreign Application Priority Data

Mar. 31, 1999 (EP) .............................. 99106603

(51) Int. Cl.⁷ .......................... B23K 20/12; B23K 31/02
(52) U.S. Cl. ...................... 228/110.1; 228/5.7; 228/164; 228/228
(58) Field of Search .............................. 228/227, 179.1, 228/180.1, 5.7, 180.5, 164, 110.1, 228; 219/121.64, 121.66

(56) References Cited

U.S. PATENT DOCUMENTS

| | | | | |
|---|---|---|---|---|
| 3,832,517 A | * | 8/1974 | Carson | |
| 4,396,819 A | * | 8/1983 | Muchkin et al. | |
| 4,712,723 A | * | 12/1987 | Moll et al. | |
| 4,759,120 A | * | 7/1988 | Bernstein | |
| 5,057,661 A | | 10/1991 | Banner | 219/56.22 |
| 5,186,378 A | | 2/1993 | Alfaro | 228/110 |
| 5,298,715 A | * | 3/1994 | Chalco et al. | |
| 5,493,069 A | | 2/1996 | Conti | 174/94 R |
| 5,896,644 A | * | 4/1999 | Lucenta et al. | |
| 6,027,008 A | * | 2/2000 | Toi et al. | |
| 6,119,924 A | * | 9/2000 | Toi et al. | |

* cited by examiner

Primary Examiner—Tom Dunn
Assistant Examiner—Kiley Stoner
(74) Attorney, Agent, or Firm—Griffith & Szipl, P.C.

(57) ABSTRACT

Method for welding two end portions (6, 8) of a coil (not shown) onto two electric contact pads or bumps (24, 26) of an integrated circuit (2) or an electronic unit of small dimensions. This welding method is characterised in that, prior to the actual welding step, a preliminary step is provided consisting in removing at least partially the insulating sheath from the electric wire (10) at least at the locations of the two end portions (6, 8) provided for the welding onto said electric contact pads or bumps (24, 26). The insulating sheath is removed locally by means of heat application, in particular using a heating press (58) working at a sufficiently high temperature to melt or sublimate the insulating sheath. The welding step is achieved at a much lower temperature than the temperature of the preliminary step, which allows the heat and mechanical stress to be reduced for the integrated circuit (2) and the bumps (24, 26) during welding of the ends (6, 8) onto said bumps.

13 Claims, 5 Drawing Sheets

METHOD FOR ASSEMBLING, BY WELDING, A COIL WITH AN INTEGRATED CIRCUIT OR AN ELECTRONIC UNIT OF SMALL DIMENSIONS

The present invention concerns a method for welding two end portions of a coil onto the two electric contact pads or bumps of an integrated circuit or an electronic unit of small dimensions. The electric connection of the two end portions of the coil on the electric contact pads or bumps is generally effected by means of a thermode provided for this purpose.

A method for assembling a coil with an electronic circuit is known, in particular from U.S. Pat. No. 5,572,410. According to this method, an electronic circuit is provided, in particular a semiconductor integrated circuit and a coil core placed in proximity. Then, an insulated electric wire is automatically wound around the core, the two end portions of the coil being arranged so as to be superposed on the electric contact bumps of the electronic circuit (see FIGS. 1 and 3). Next, the two end portions of the coil located directly above the metal bumps are welded to the bumps by means of an automatic welding device which removes the insulation from the coil wire, i.e. the insulating sheath protecting the electric wire, simultaneously with the welding (column 3, lines 26 to 30).

A major drawback results from the assembly method described hereinbefore. Indeed, it has been observed that the implementation of the method described hereinbefore with integrated circuits causes relatively significant damage to the integrated circuit itself, in particular to the top layers, particularly the passivation layer.

Indeed, welding the ends of the insulated wire of the coil to the metal pads or bumps of the integrated circuit by thermocompression requires a certain pressure and a high temperature, for example of the order of 500° C.

In the case of the present invention, it has been observed that the high temperature necessary to remove the insulating sheath and to simultaneously weld the electric wire onto the metal pads or bumps of the integrated circuit generates significant mechanical and thermal stress, due, in particular, to dilatation of the metal pads or bumps of the integrated circuit. The pressure and heat necessary for the method described hereinbefore thus generate microcracks in the integrated circuit which can damage it and make it unusable. Thus, the industrial yield with this method is relatively low.

The object of the present invention is to overcome the aforecited drawbacks by providing an efficient welding method which protects the circuit or electronic unit from mechanical or thermal stress damaging the circuit or electronic unit.

The present invention therefore concerns a method for welding two end portions of a coil onto two electric contact pads or bumps of an integrated circuit or an electronic unit of small dimensions, this method being characterised in that, prior to the step of welding the two end portions onto the two electric contact pads or bumps, a preliminary step is provided, consisting in removing at least partially the insulating sheath from the electric wire forming the coil in the regions of the two end portions provided for welding. Preferably, the localised removal of the insulating sheath is effected by a heat supply used to melt or sublimate the insulating sheath at the locations of the two end portions provided for welding the coil to the integrated circuit or electronic unit.

As a result of the welding method according to the invention, it is possible to weld the two ends of the electric wire forming the coil to the integrated circuit or electronic unit with a relatively low temperature, in particular less than 200° C. Indeed, the removal of the insulating sheath can be effected at a high temperature of the order of 500° C., whereas the temperature necessary for welding the electric wire itself onto the metal pad or bumps of the circuit or electronic unit requires a much lower temperature. Moreover, a relatively low welding pressure is necessary in these conditions. In a particular embodiment of the invention, the ends of the electric wire of the coil are welded using an ultrasound head which leaves the metal pads or bumps at a temperature close to the ambient temperature.

The invention will be described hereinafter with the aid of the following description, made with reference to the annexed drawings given by way of non-limiting schematic examples, in which.

Figure 1:
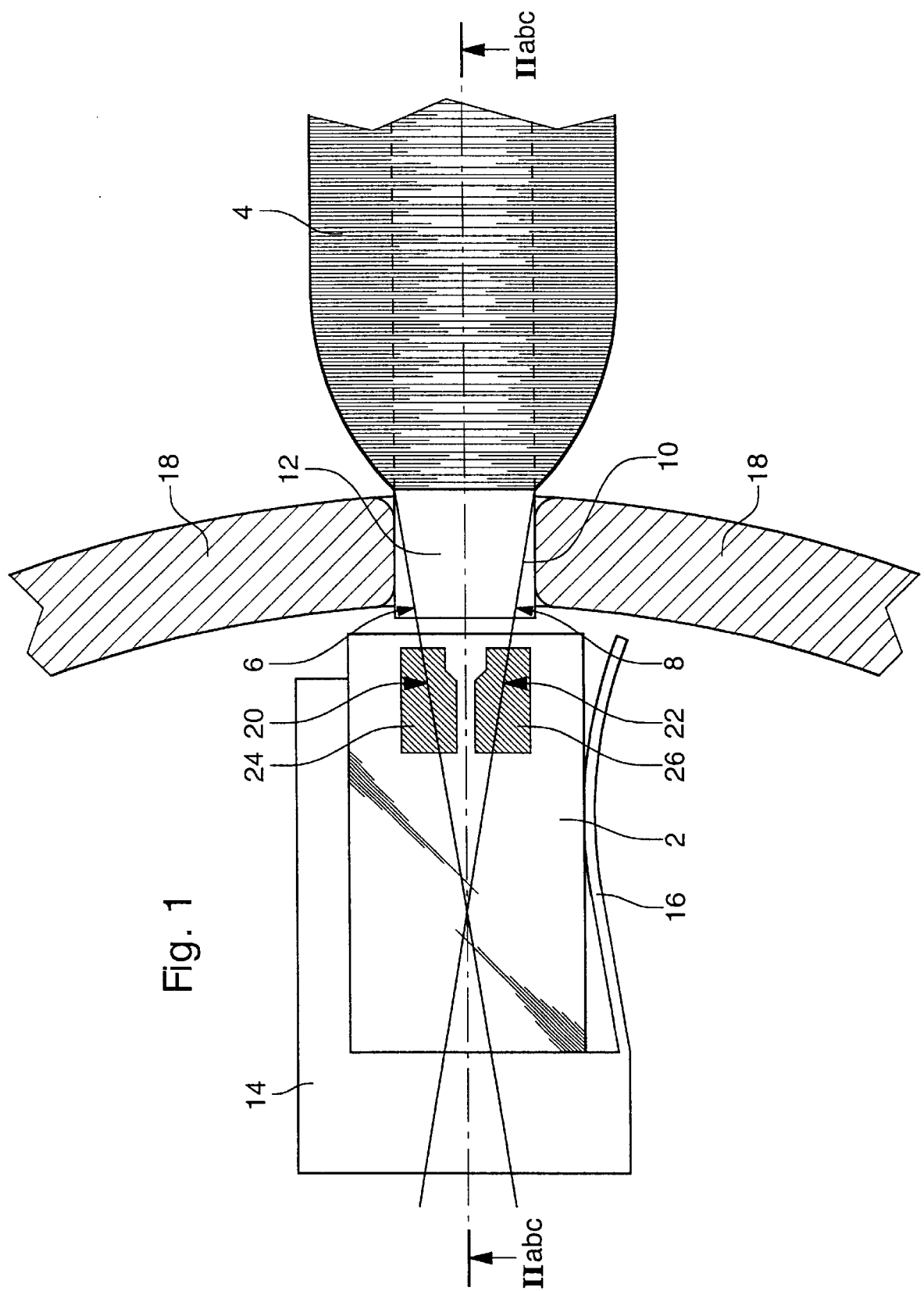
FIG. 1 is a top view of a coil and an integrated circuit in an arrangement allowing the end portions of the coil wire to be welded onto the metal bumps of the integrated circuit.

FIG. 1 shows an integrated circuit 2 and a coil 4 having two end portions 6 and 8 arranged in a similar manner to the prior art of U.S. Pat. No. 5,572,410 in which those skilled in the art will find further detailed information concerning the assembly method according to the present invention, in particular as regards the winding of the coil wire 10 around core 12 which bears the coil. The electronic circuit is held in a first support 14 including an elastic member 16 used to hold circuit 2 rigidly. Likewise, the coil is held in the extension of circuit 2 by a second support 18 which includes gripping means which grip one end of core 12. The ends portions 6 and 8 of wire 10 forming the coil have two respective regions 20 and 22 which are superposed respectively on two electric contact pads 24 and 26 of circuit 2. In particular, electric contact pads 24 and 26 are formed by metal bumps. The dimensions of these metal bumps can be variable and are adapted to the welding method according to the invention. Generally, these bumps are provided with a relatively long length allowing welding of wire 10 over a certain length so as to assure that ends 6 and 8 are properly secured to bumps 24 and 26.

Figure 2A:
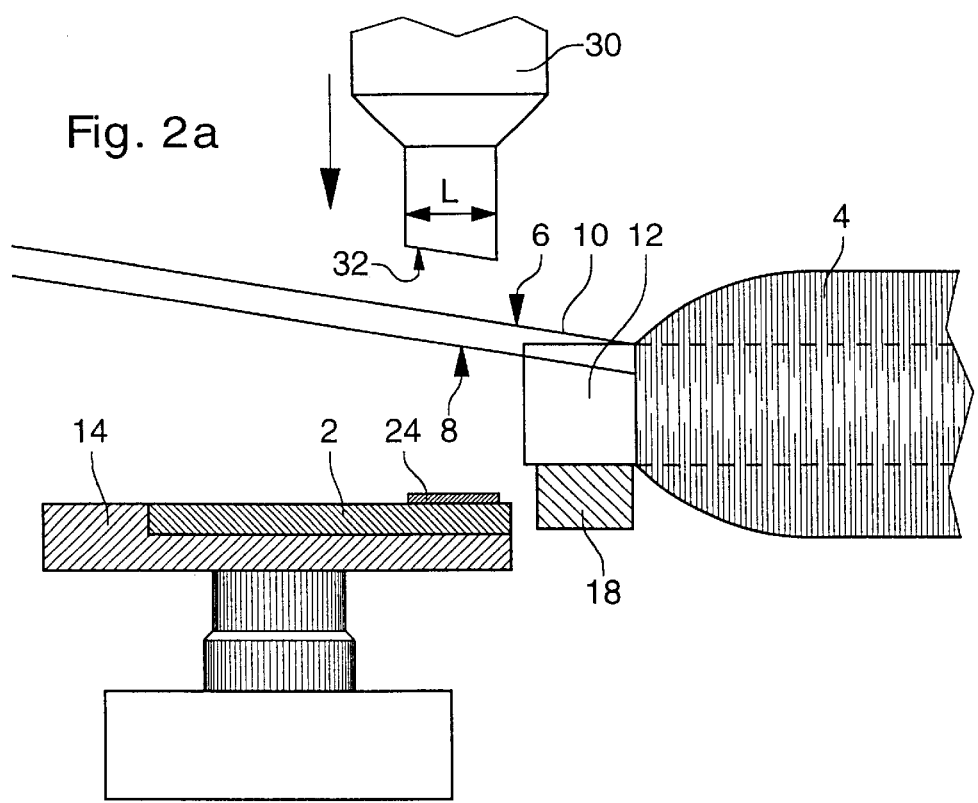
FIGS. 2a, 2b and 2c show schematically a first implementation of the method according to the invention.
Figure 2B:
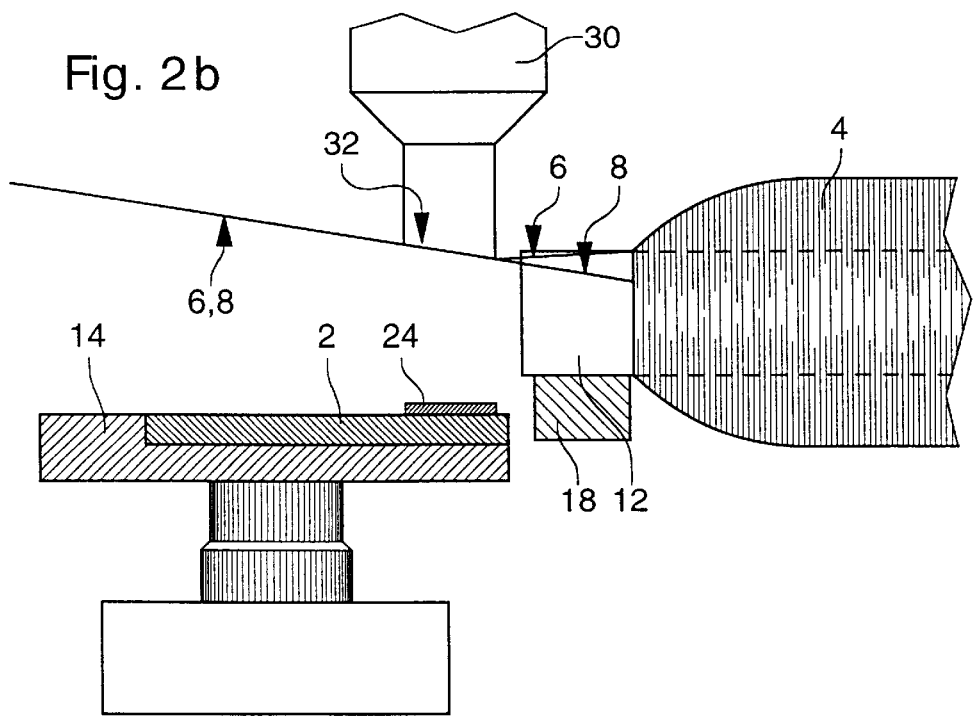
Figure 2C:
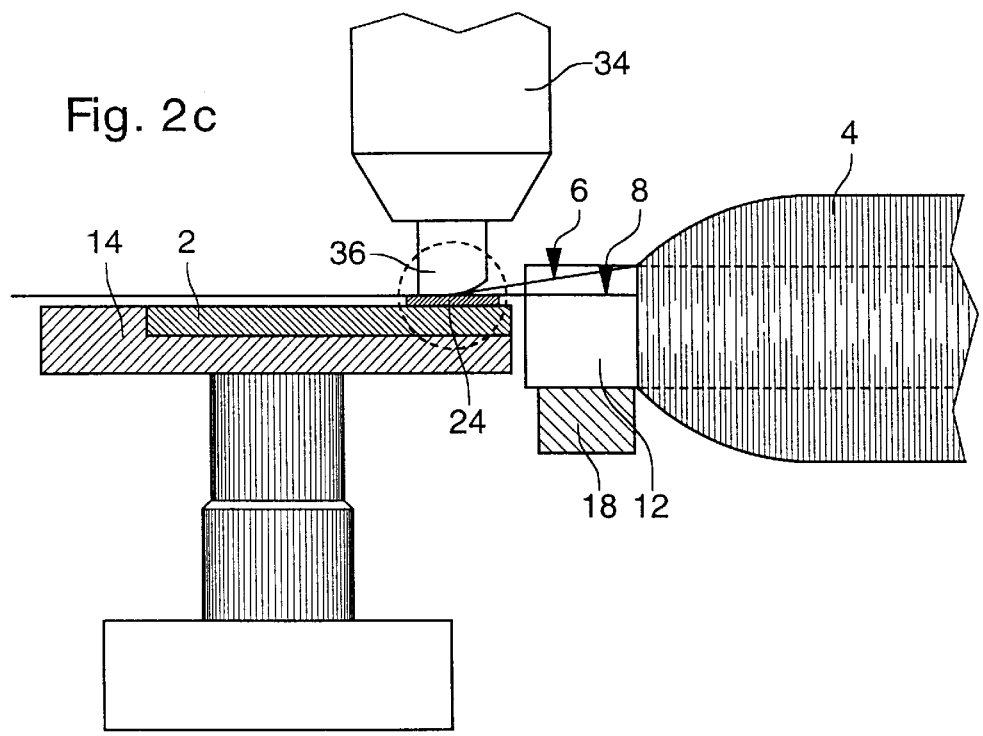

FIGS. 2a to 2c include a partial cross-section of FIG. 1. The elements already described hereinbefore will not be described in detail again hereinafter.

Once integrated circuit 2 and coil 4 are positioned in their respective support 14 and 18, end portions 6 and 8 of wire 10 are held at a certain distance from bumps 24 and 26 to effect a preliminary pre-welding step according to the invention. As shown in FIGS. 2a and 2b, a first heating unit 30 having a heating element 32 with a width L substantially equal to or greater than the length of bumps 24 and 26 is brought above end portions 6 and 8 and moved downwards in the direction of these portions to heat wire 10 locally and to melt or sublimate at least partially the insulating sheath surrounding the electric wire. It will be noted that heating element 32 preferably has an inclination substantially corresponding to the inclination of end portions 6 and 8 so as to limit the stress, particularly tension stress, on end portions 6 and 8. This feature is all the more important when the two portions 6 and 8 are not initially located in the same plane. In this latter case, it is also possible for heating element 32 to have two different levels along a direction perpendicular to the plane of FIG. 2a in order not to have to bring the two portions 6 and 8 in the same plane, as is the case in FIG. 2b.

As already mentioned, the usual temperature for melting or sublimating the insulating sheath of an electric wire used for a coil of small dimensions is as high as approximately 500° C. Unit 30 is thus arranged to provide such a temperature in proximity to heating element 32. It will be noted in FIGS. 2a and 2b that the preliminary pre-welding step is effected above bumps 24 and 26 of integrated circuit 2, end portions 6 and 8 of the coil wire already being positioned so as to have respectively regions 20 and 22 superposed on bumps 24 and 26. However, in a variant of this implementation, the preliminary pre-welding step can be effected prior to alignment of the coil and the integrated circuit which is intended for it which is added following this preliminary step, in particular to prevent the material forming the sheath from spreading over bumps 24 and 26.

In another implementation variant of the method according to the invention, the preliminary pre-welding step is effected at a station located upstream of the actual welding station. In this case, coil 4 undergoes a movement along the direction perpendicular to the plane of FIG. 2a. At a first station, first heating unit 30 removes the insulating sheath at the locations of portions 6 and 8 provided for welding to bumps 24 and 26. Then, coil 4 with its core 12 and support 18 are moved in the direction of a second working station to effect the welding step, the relative position of coil 4 and circuit 2 corresponding then, in a top view, to FIG. 1.

Once the preliminary pre-welding step is effected, first heating unit 30 is withdrawn or in the variant providing two distinct working stations for the preliminary step and the welding step, coil 4 is moved to the welding station. End portions 6 and 8 are brought into proximity with bumps 24 and 26, in particular by a vertical movement of circuit 2. Next, welding is effected using a second heating unit 34 including a heating element 36. This second heating unit defines a conventional thermode. As already mentioned, the welding of the bare end portions to bumps 24 and 26 requires a much lower temperature than the temperature necessary to remove the insulating sheath. By way of example, the temperature of heating element 36 is comprised between 100° and 150° C. to effect the welding.

Figure 3:
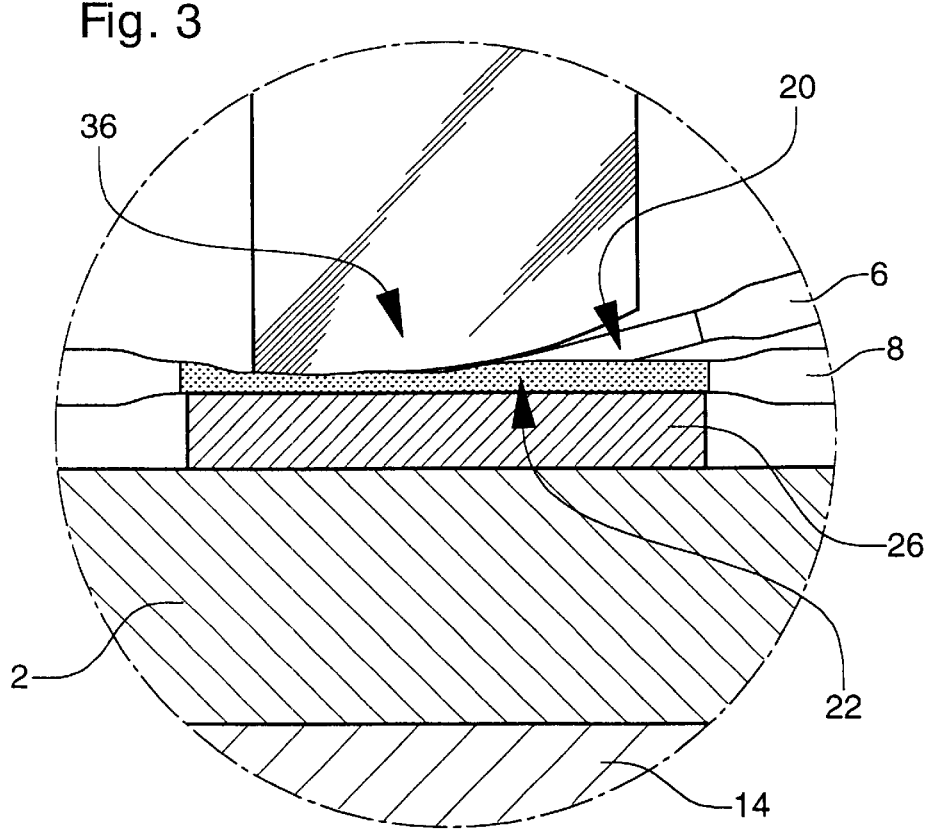
FIG. 3 is an enlarged view of a part of FIG. 2c.

FIG. 3 is an enlarged partial view of FIG. 2c where the two bare regions 20 and 22 are seen, i.e. without the insulating sheath and heating element 36 with a profile favourable to welding and to breaking the remaining end portions of the opposite side to coil 4.

According to a variant, an ultrasound head is used in place of the thermode so as to effect welding while keeping the temperature of the bumps close to the ambient temperature. This allows all the risks linked to heating the bumps and thus to the dilatation thereof to be removed.

Figure 4:
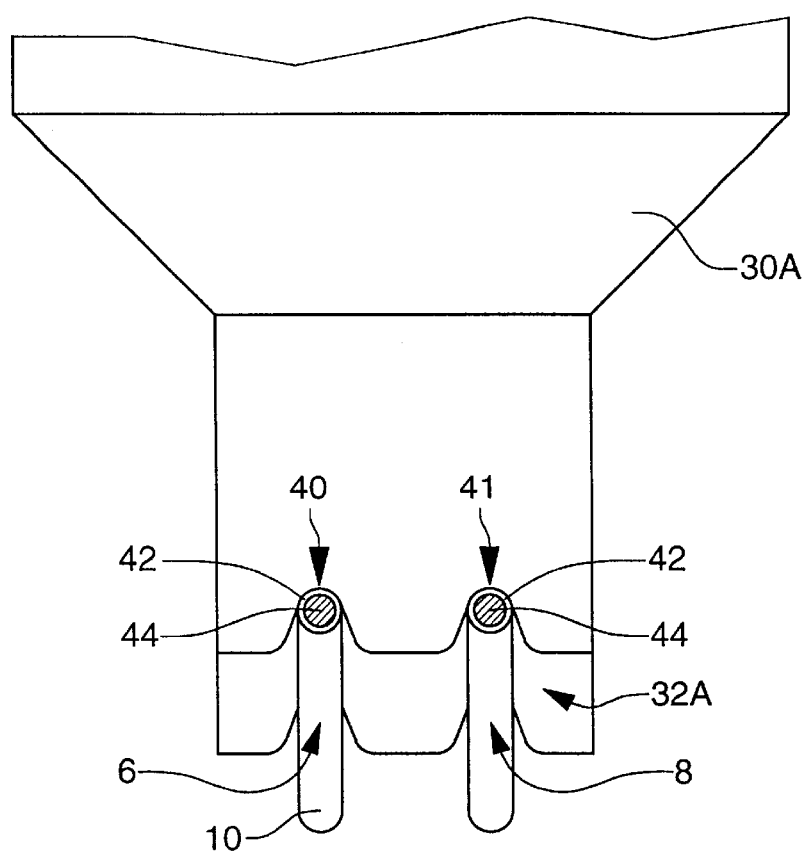
FIG. 4 shows an improved embodiment of the unit for removing the insulating sheath shown in FIG. 2.

FIG. 4 shows an improved variant of the first heating unit used for the preliminary pre-welding step. So as to ensure efficient heating of the insulating sheath to melt it or sublimate it locally, heating unit 30A includes a heating element 32A having two undulatory recesses or grooves 40 and 41 in which end portions 6 and 8 of coil wire 10 are respectively inserted. The profile of heating element 32A thus allow the two portions 6 and 8 to be properly positioned to heat sheath 42 efficiently over the whole periphery of metal wire 44 forming electric coil wire 10. The profile of grooves 40 and 41 can be made according to various variants.

Figure 5:
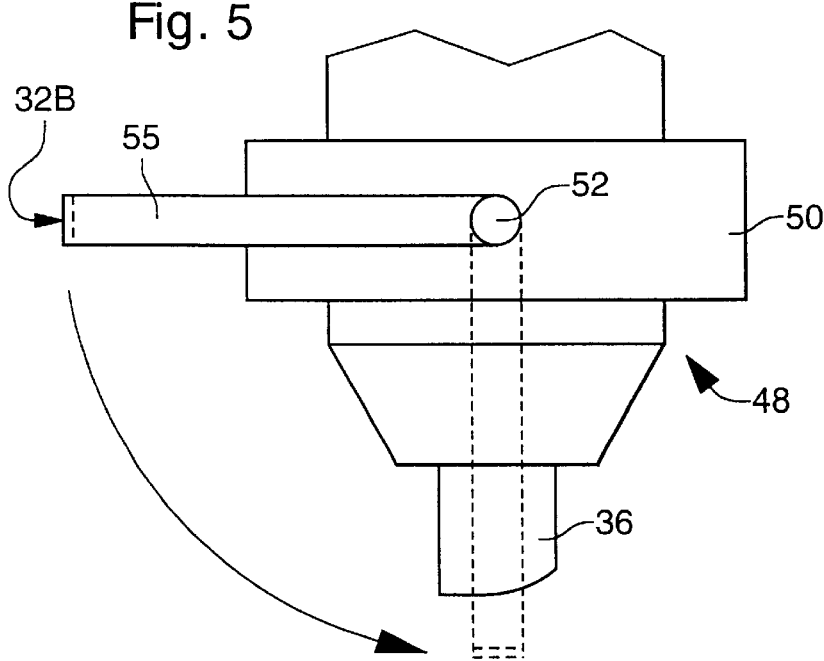
FIG. 5 shows schematically an embodiment of a welding unit alternately allowing the insulating sheath to be removed and the ends of the electric wire to be welded onto the metal bumps.

FIG. 5 shows a heating unit 48 including a first heating element 32B similar to that described in FIG. 2c for the actual welding step. High temperature heating element 32B is associated with motor means 50 allowing element 32B to rotate about an axis 52. Heating element 32B is connected to two lateral arms one of which 55 is visible in FIG. 5. These lateral arms and heating element 32B form a U both ends of which are connected to motor means 50. By a movement of rotation, heating element 32B is brought into a vertical position, shown in dotted lines, to effect the preliminary pre-welding step in which the insulating sheath of the coil wire is locally melted or sublimated, as previously described. Once this preliminary step is completed, heating element 32B is brought back into a position in which heating element 36 for welding is cleared, in particular in a horizontal position as shown in FIG. 5. As previously described, heating element 36 preferably works at a relatively low temperature with respect to the working temperature of heating element 32B.

Figure 6A:
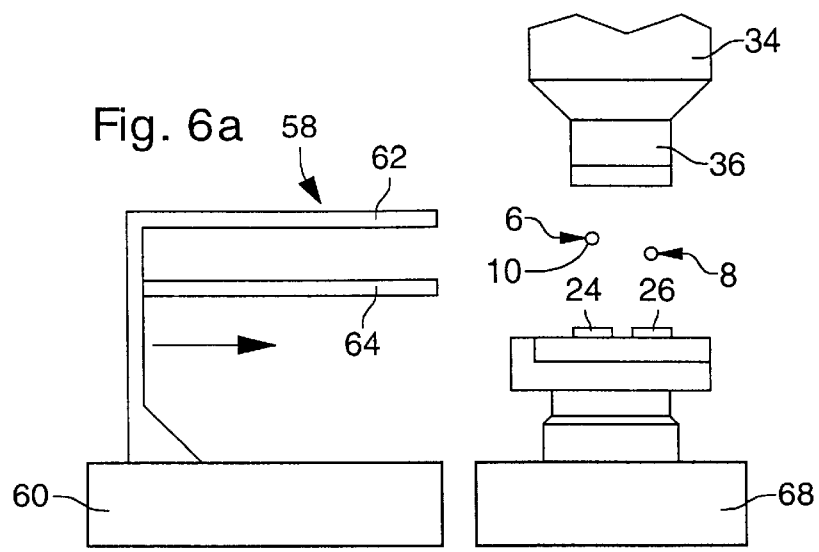
FIGS. 6a, 6b and 6c describe schematically a second implementation of the method according to the invention.
Figure 6B:
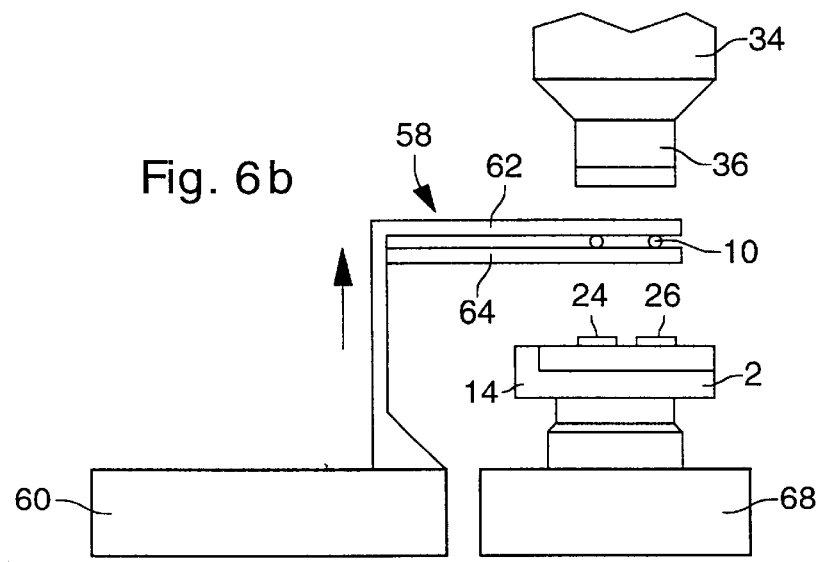
Figure 6C:
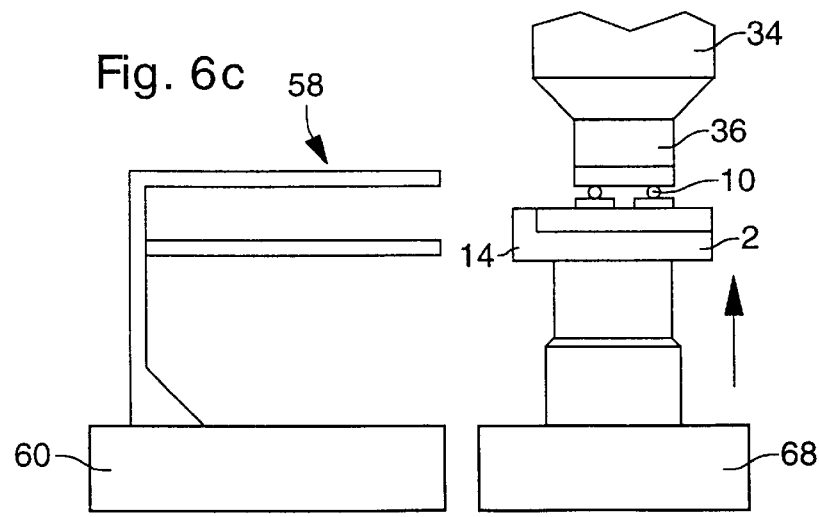

FIGS. 6a to 6c show a second implementation of the method according to the invention. Once electronic circuit 2 is set in place on its support 14 and the coil is formed and arranged for welding with its two end portions 6 and 8 respectively having two regions superposed on bumps 24 and 26 of circuit 2, portions 6 and 8 are held at a certain distance from integrated circuit 2 in the preliminary pre-welding step and the insulating sheath is removed locally by means of a heating press 58. This heating press 58 is mounted so as to move on a base 60 and includes two arms or plates 62 and 64 arranged to move in relation to each other so as to be able to vary the distance between them.

In order to effect the preliminary pre-welding step, thermode 34 and integrated circuit 2 are placed at a certain distance from end portions 6 and 8 of wire 10 forming the coil (not shown in FIGS. 6a to 6c). Heating press 58 then undergoes a horizontal movement with arms or plates 62 and 64 in a spread out position, until at least regions 20 and 22 of wire 10 (see FIG. 1) are located between arms or plates 62 and 64. Next, arms 62 and 64 are brought closer together by a vertical movement of arm 64 until wire 10 is in contact with the two arms 62 and 64. At least one of these arms is heated, preferably both, to melt or sublimate the insulating sheath surrounding the metal wire of coil wire 10. Then, arms 62 and 64 are again separated and heating press 58 is removed. Next, end portions 6 and 8 each having a bare region are brought closer to metal bumps 24 and 26 to be welded onto them. In order to do this, it is possible either to move end portions 6 and 8 relative to integrated circuit 2, in particular by varying the inclination of these end portions or by varying the relative position of the coil with respect to integrated circuit 2. However, in the preferred variant shown in FIG. 6c, integrated circuit 2 is moved in the direction of end portions 6 and 8. In order to do this, support 14 is able to be moved along a vertical direction in relation to base 68 on which it is mounted. Finally, thermode 34 is moved downwards in the direction of end portions 6 and 8 to weld these portions onto electric contact bumps 24 and 26 of integrated circuit 2.

What is claimed is:

1. A method for welding two end portions of a coil onto two electric contact pads or bumps of an integrated circuit or an electronic unit of small dimensions comprising the steps of:

supplying a coil comprising an electric wire at least partially coated with an insulating sheath, the coil having three main portions, the three main portions including a first end portion, a second end portion and a third portion, wherein the third portion is wound and defines a winding, and the first end portion and the second end portion are apart from the winding and define two end portions of the coil;

supplying an integrated circuit, or an electronic unit of small dimensions, having two electric contact pads or bumps;

arranging the two end portions respectively into position relative to the winding, wherein each respective position corresponds to a predetermined position appropriate for performing a welding step and at a certain distance from the electrical contact pads or bumps;

at least partially removing the insulating sheath of the coil from the two end portions in a preliminary step while the two end portions are in the predetermined position, wherein the step of partially removing the insulating sheath is carried out at two locations respectively the two end portions, each location of the two locations being a determined location on the coil relative to the winding; and welding the two end portions onto the two electric contact pads or bumps.

2. A method for welding according to claim 1, wherein said step of partially removing the insulating sheath includes at least partially applying heat locally so as to melt or sublimate said insulating sheath at said two locations.

3. A method according to claim 2, wherein said applying heat step is performed using a first temperature, and said welding step is performed using a second temperature substantially lower than said first temperature.

4. A method according to claim 3, wherein said first temperature is about 500° C. and said second temperature is less than 200° C.

5. A method for welding according to claim 1, including a step of moving the integrated circuit or the electronic unit to the coil, wherein said step of moving the integrated circuit or the electronic unit is performed between said step of partially removing the insulating sheath and said welding step.

6. A method for welding according to claim 1, wherein said step for partially removing the insulating sheath is effected by means of a first heating element capable of movement, and said welding step is effected by a second heating element formed by either a thermode working at a relatively low temperature or by an ultrasound head, wherein said first heating element and said second heating element form a single heating unit that allows said first heating element to move relative to said second heating element.

7. A method for welding according to claim 7, wherein said step for partially removing the insulating sheath is effected by means of a first heating unit, and said welding step is effected by a welding unit formed by either a thermode working at a relatively low temperature or by an ultrasound head, wherein said first heating unit and said welding unit are distinct.

8. A method for welding according to claim 7, wherein said step of partially removing the insulating sheath further comprises applying heat to the insulating sheath at least to said two locations, wherein said first heating unit has two grooves for accommodating said two end portions respectively so as to assure that said applying heat step applies heat over an entire periphery of said insulating sheath to effect melting or sublimating entirely or almost entirely the insulating sheath at said two locations.

9. A method for welding according to claim 7, wherein said arranging step arranges said first end portion and said second end portion into said respective predetermined position such that each end portion is at a different height with respect to said electric contact pads or bumps, and said first heating unit includes a heating element provided with two different contact zones, each contact zone being at a different level so that one of said contact zones contacts respectively one of said first end portion or said second end portion at said predetermined position.

10. A method for welding according to claim 1, wherein said step of removing the insulating sheath is effected by using a heating press which is movable relative to said two end portions, said heating press comprising two arms or plates which are movable relative to each other to effect a variable spread out position, and said step of removing the insulating sheath further comprises:

holding said integrated circuit or said electronic unit and a welding unit at a certain distance from said two end portions, wherein said welding unit is for effecting said welding step;

inserting said heating press between said two end portions and said welding unit, said heating press having said arms or plates in a spread out position;

bringing said arms or plates of said heating press closer together so that each arm or plate is in contact with said insulating sheath; and performing at least partial removal of said insulating sheath by heating said insulating sheath locally.

11. A method for welding according to claim 1, wherein the welding step is performed at a temperature of less than 200° C.

12. A method for welding according to claim 11, wherein the welding step is effected by a welding unit comprising an ultrasound head.

13. A method for welding according to claim 1, including a step of moving the two end portions together with the winding towards the pads or bumps of the integrated circuit or the electronic unit, wherein said step of moving the two end portions is performed between said step of partially removing the insulating sheath and said welding step.

* * * * *

UNITED STATES PATENT AND TRADEMARK OFFICE
CERTIFICATE OF CORRECTION

PATENT NO. : 6,409,071 B2 Page 1 of 1
DATED : June 25, 2002
INVENTOR(S) : Elko Doering, Pascal Cattin and Uwe Thiemann It is certified that error appears in the above-identified patent and that said Letters Patent is hereby corrected as shown below:

<u>Column 5,</u>
Line 18, insert the word -- on -- after "respectively."
Line 50, replace the number "7" with the number -- 1 --.

Signed and Sealed this

Seventeenth Day of February, 2004

JON W. DUDAS
*Acting Director of the United States Patent and Trademark Office*